H. WEXEL.

ORNAMENTAL CHAIN.

No. 9,814. Reissued July 19, 1881.

WITNESSES:

J. A. Miller Jr.

Wm. L. Roff

INVENTOR:

Henry Wexel by Joseph A. Miller atty

N. PETERS, Photo-Lithographer, Washington, D. C.

UNITED STATES PATENT OFFICE.

HENRY WEXEL, OF ATTLEBOROUGH, MASSACHUSETTS.

ORNAMENTAL CHAIN.

SPECIFICATION forming part of Reissued Letters Patent No. 9,814, dated July 19, 1881.

Original No. 190,105, dated April 24, 1877. Application for reissue filed May 27, 1881.

*To all whom it may concern:*

Be it known that I, HENRY WEXEL, of Attleborough, in the county of Bristol and State of Massachusetts, have invented a new and Improved Method of Making Double-Curb Chains; and I hereby declare that the following is a full, clear, and exact description of the same, reference being had to the accompanying drawings, forming part of this specification.

This invention has reference to an improvement in double-curb chains, such as are used for ornamental purposes.

The invention consists in giving the links of a double-curb chain the required twist before they are put together to form the chain.

The object of the invention is to cheapen the manufacture of such chains, save the soldering of each separate link, the strain on the links caused by twisting the chain after the links have been formed into a chain, and the compression of the wire by subjecting the chain to compression.

Figure 2:
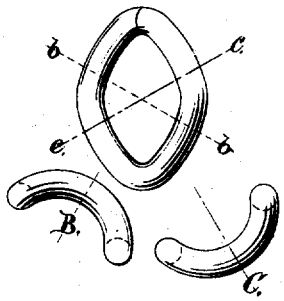
Figure 1:
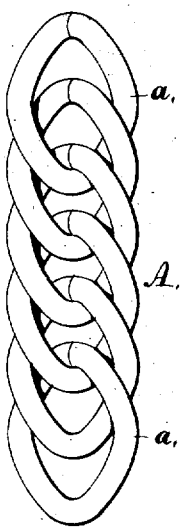
Figure 3:
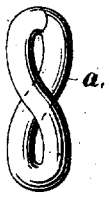
Figure 4:
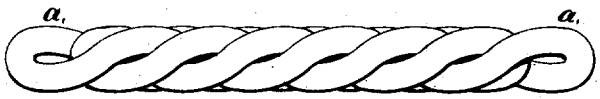
Figure 5:
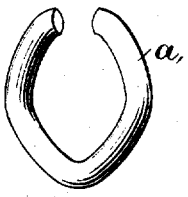

Figure 1 represents a section of a double-curb chain. Fig. 2 represents one link of such a chain, formed and twisted so that a chain made of a number of such links will present the appearance of a flattened braided band, the link being curved on the line *c c*, as shown at C, and on the line *b b*, as shown at B, the views C and B representing the link as seen from a point at right angles to the dotted line *c c* and *b b*. Fig. 3 is a side view of one of the links, showing the twist in the same. Fig. 4 is a side view of a double-curb chain, showing the twisted links interlocked. Fig. 5 is a view of the twisted link opened to receive the links to be inserted.

In the old process of making curb-chains the links are first coupled together, and the chain is then subjected to a twisting strain, so as to twist the links, and is then subjected to compression, so as to retain the proper shape and compactness. In order to accomplish this it is necessary to solder the open ends of each link together to prevent them from being separated and opened during the operation of twisting and compressing.

In ornamental chains the soldering of the link is not required to give the desired strength to the chains, as chains made by my improved method without soldering the links have the necessary strength to withstand all strain required of them.

The soldering greatly augments the cost of chains, while some links will even then be forced open. I avoid the latter objection, and also the expense of soldering, by shaping each link separately before they are all coupled together.

Referring to the drawings, A represents a double-curb chain made up of the links *a a*, which are formed as shown in Figs. 2 and 3. These links are given, before being put together in a chain, the same form that the links in a soldered chain receive after being put together, soldered, and subjected to a twisting and compressing strain. When they are interlinked in a chain they present the same appearance, except that they need not be soldered and have not the flattened appearance given them in the operation of twisting and rolling.

In my improved method the elliptical links are formed and twisted in suitable dies, or by other means, as shown in Figs. 2 and 3. They are opened, as shown in Fig. 5, to receive the links to be interlocked, and when the links are closed the chain is completed without the necessity of soldering the links or subjecting the chain to any twisting or compressing strain. The manufacture of chains is thus greatly expedited, as one workman can make ten times the length of chain in a given time as can be done in the old way.

Having thus described my invention, I claim as new and desire to secure by Letters Patent—

1. As an improved article of manufacture, a double-curb chain formed of links bent or twisted into the shape described when coupled together without subjecting the chain to compression and twisting, as described.

2. As an improved article of manufacture, a double-curb chain formed of links bent or twisted into the shape described and shown, and united together without the employment of solder.

3. The improvement in the process of manufacturing double-curb chains, the same consisting in forming the links with the desired twist, so that the links, when coupled together, will form a complete double-curb chain, as described.

4. The improved step in the process of making double-curbed chains, the same consisting in imparting to each link the desired twist before they are coupled together, so as to form a double-curb chain without subjecting the same to the twisting and compressing strain heretofore required to form the chain, as described.

HENRY WEXEL.

Witnesses:
JOSEPH A. MILLER,
JOSEPH A. MILLER, Jr.